(12) United States Patent
Kurita et al.

(10) Patent No.: US 8,151,834 B2
(45) Date of Patent: Apr. 10, 2012

(54) HYDROGEN COMPRESSOR SYSTEM

(75) Inventors: Shinichiro Kurita, Kasumigaura (JP); Shigeru Arai, Tsuchiura (JP); Akinori Akanuma, Tsuchiura (JP); Youichirou Fukai, Omitama (JP); Haruo Miura, Kasumigaura (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 1358 days.

(21) Appl. No.: 11/657,488

(22) Filed: Jan. 25, 2007

(65) Prior Publication Data

US 2007/0227614 A1    Oct. 4, 2007

(30) Foreign Application Priority Data

Mar. 29, 2006   (JP) ................. 2006-089835

(51) Int. Cl.
*B65B 1/04* (2006.01)

(52) U.S. Cl. .......... 141/105; 141/82; 141/104; 141/192; 62/50.2; 137/263

(58) Field of Classification Search .................... 141/18, 141/21, 69, 70, 82, 83, 94, 95, 98, 100–107, 141/192, 234, 236, 248; 62/50.1–50.5; 137/255, 137/263; 48/190–192
See application file for complete search history.

(56) References Cited

U.S. PATENT DOCUMENTS

| | | | |
|---|---|---|---|
| 5,370,159 A | 12/1994 | Price | |
| 5,409,046 A * | 4/1995 | Swenson et al. | 141/11 |
| 6,123,909 A * | 9/2000 | Yamamoto et al. | 423/210 |
| 6,305,442 B1 * | 10/2001 | Ovshinsky et al. | 141/231 |
| 7,128,103 B2 * | 10/2006 | Mitlitsky et al. | 141/248 |
| 7,287,558 B2 * | 10/2007 | Hobbs | 141/97 |
| 7,624,770 B2 * | 12/2009 | Boyd et al. | 141/11 |
| 2003/0113602 A1 * | 6/2003 | Nau et al. | 429/25 |
| 2005/0056661 A1 * | 3/2005 | Casamatta et al. | 222/3 |

FOREIGN PATENT DOCUMENTS

| | | |
|---|---|---|
| JP | 2003-194297 A | 7/2003 |
| JP | 2004-116544 A | 4/2004 |
| JP | 2005-273811 A | 10/2005 |
| JP | 2005-315139 A | 11/2005 |

OTHER PUBLICATIONS

European Search Report Jun. 15, 2010 (Five (5) pages).

* cited by examiner

*Primary Examiner* — Timothy L Maust
(74) *Attorney, Agent, or Firm* — Crowell & Moring LLP

(57) ABSTRACT

A hydrogen compressor system comprises a hydrogen generating apparatus for generating hydrogen gas to be supplied to a fuel cell vehicle and a multi-stage reciprocating compressor for pressurizing the hydrogen gas generated by the hydrogen generating apparatus. High pressure tanks having maximum use pressure of 20 MPa are connected to middle stages of the multi-stage reciprocating compressor by gas supplying lines via valves. By opening/closing the valves, hydrogen gas in the high pressure tanks can be selectively supplied to the middle stages of the multi-stage reciprocating compressor.

8 Claims, 2 Drawing Sheets

HYDROGEN COMPRESSOR SYSTEM

BACKGROUND OF THE INVENTION

The present invention relates to a hydrogen compressor system, more particularly a hydrogen compressor system suitable for use in a hydrogen refueling station for supplying hydrogen gas to a fuel cell vehicle.

An example of a hydrogen refueling station for supplying hydrogen to a fuel cell vehicle is described in JP-A-2003-194297. The hydrogen refueling station described in JP-A-2003-194297 is a so-called on-site station in which hydrogen is obtained by electrolysis of water. In the on-site station, because pressure of generated hydrogen gas is about 0.6 MPa, a hydrogen compressor system for pressurization is required to supply hydrogen to the fuel cell vehicle. In JP-A-2003-194297, a hydrogen compressor is used to get higher pressure and the compressor is lubricated with water in order to avoid using of oil.

Another example of the system for supplying hydrogen to a fuel cell vehicle is described in JP-A-2005-273811. A hydrogen supplying system described in JP-A-2005-273811 is so-called off-site hydrogen supplying system in which refined hydrogen gas is filled in a hydrogen tank with high pressure to supply the fuel cell vehicle. The system described in JP-A-2005-273811 using the hydrogen tank can supply a required amount of hydrogen to the fuel cell vehicle, regardless of high or low filling load of hydrogen gas.

Because pure hydrogen used in a fuel cell vehicle has wide explosion limit and a large amount of pure hydrogen is likely to be obtained from the nature and also its environmental load is low, pure hydrogen is expected to be an energy source as a substitute for petroleum. However, a low-cost fuel supplying system is required in order to cope with a wide variety of uses.

Thus, in the conventional hydrogen supplying system described in JP-A-2003-194297, a hydrogen generating apparatus using electrolysis of water to obtain hydrogen is used. In the apparatus, because a large amount of time is required from start until a steady state of hydrogen generation is achieved, it is desirable that the apparatus is stopped when hydrogen filling load to the fuel cell vehicle is low in order to reduce operating cost. However, the apparatus is not suitable for start and stop in a short period of time because it has a compressor and the like. As a result, for example when the filling load to the fuel cell vehicle is low, a part of generated hydrogen gas becomes excessive and there is no choice but to wastefully burn the hydrogen gas or emit the hydrogen gas to the atmosphere without any treatment.

On the other hand, in the off-site hydrogen supplying system to the fuel cell vehicle described in JP-A-2005-273811, just a predetermined amount of hydrogen can be supplied regardless of the filling load, but suction pressure of the compressor must be limited to at most about 6 MPa in consideration of the number of compressing stages in the compressor for pressurization. As a result, a larger amount of hydrogen is not supplied to the fuel cell vehicle and remains in the hydrogen tank, so that operating efficiency of the hydrogen tank is reduced.

The present invention is provided in view of the above described disadvantages in the prior arts and it is an object of the present invention to effectively use hydrogen generated by the hydrogen generating apparatus as much as possible. It is another object of the present invention to reduce operating cost of the fuel cell vehicle using hydrogen as a fuel. It is still another object of the present invention to enhance efficiency of the hydrogen refueling station for supplying hydrogen to the fuel cell vehicle. Excessive hydrogen is not exhausted, but recycled as much as possible and the amount of hydrogen which remains in the hydrogen tank is reduced. At least one of the objects is accomplished by the present invention.

BRIEF SUMMARY OF THE INVENTION

A feature of the present invention which accomplishes the above described objects is that a hydrogen compressor system provided in an on-site hydrogen refueling station comprises a hydrogen generating apparatus and a multi-stage reciprocating compressor having multiple compressing stages for pressurizing hydrogen generated by the hydrogen generating apparatus so that the hydrogen can be supplied to a fuel cell vehicle, wherein hydrogen gas storing means is provided into which compressed hydrogen gas is supplied from a middle stage of the multi-stage reciprocating compressor and the hydrogen storing means can supply the supplied hydrogen gas to an initial or a middle stage of the multi-stage reciprocating compressor, and the station can be also an off-site hydrogen refueling station.

In this feature, it is preferable that the multi-stage reciprocating compressor comprises snubbers on suction sides of respective stages and the hydrogen gas storing means comprises a high pressure tank unit, and the high pressure tank unit and at least one of the plurality of snubbers are connected via a remote control valve. In addition, it is preferable that at least one of the compressing stages having the snubber connected to the high pressure tank unit on the suction side has a bypass line for bypassing between the suction side and a discharge side and a valve provided on the bypass line.

In the above described feature, it is preferable that the hydrogen generating apparatus comprises a reformer and the multi-stage reciprocating compressor comprises a five-stage reciprocating compressor in which discharge pressure of a final stage is equal to or larger than 70 MPa, and the hydrogen gas storing means comprises a high pressure tank into which discharged hydrogen gas of a third compressing stage is supplied. First to third compressing stages of the multi-stage reciprocating compressor each may have a piston and fourth and fifth compressing stages each may have a plunger and discharge pressure of the third compressing stage may be 15 to 20 MPa.

Another feature of the present invention which accomplishes the above described objects is that a hydrogen compressor system comprises a hydrogen generating apparatus for generating hydrogen gas to be supplied to a fuel cell vehicle and a multi-stage reciprocating compressor for pressurizing the hydrogen gas generated by the hydrogen gas generating apparatus, wherein high pressure tanks having maximum use pressure of 20 MPa are connected to middle stages of the multi-stage reciprocating compressor by gas supplying lines via valves, and hydrogen gas in the high pressure tanks can be selectively supplied to the middle stages of the multi-stage reciprocating compressor by opening/closing the valves.

In this feature, it is preferable that the multi-stage reciprocating compressor includes the middle stages to which the gas supplying lines connect, and a compressing stage on an upstream side of the middle stages has a suction side and a discharge side connected to each other by a bypass line on which a switching valve is provided, and the switching valve provided on the bypass line is opened when hydrogen in the high pressure tank is supplied to the multi-stage reciprocating compressor. In addition, it is preferable that the multi-stage reciprocating compressor has a snubber on suction side of respective compressing stages and each compressing stage has a control valve on a suction line between the snubber and the suction side.

Still another feature of the present invention which accomplishes the above described objects is that a hydrogen compressor system comprises a first line wherein hydrogen gas generated by a hydrogen generating apparatus is pressurized in a multi-stage reciprocating compressor to supply to a fuel cell vehicle and a second line wherein hydrogen gas is supplied from high pressure tanks, in which hydrogen gas is filled with a lower pressure than discharge pressure of the reciprocating compressor, to initial or middle stages of the reciprocating compressor and the hydrogen gas is pressurized in the reciprocating compressor to supply to the fuel cell vehicle, wherein when filling load of hydrogen gas to the fuel cell vehicle is low, the hydrogen gas is stored in the high pressure tank using the second line, while when the filling load is high, the hydrogen gas stored in the high pressure tank using the second line is supplied to the reciprocating compressor to reduce compression ratio of the reciprocating compressor.

Still another feature of the present invention which accomplishes the above described objects is that a hydrogen compressor system comprises a multi-stage reciprocating compressor for pressurizing hydrogen gas, high pressure tanks in which hydrogen gas is filled with a lower pressure than discharge pressure of the multi-stage reciprocating compressor, and a plurality of gas supplying lines for supplying hydrogen gas from the high pressure tanks to initial or middle stages of the reciprocating compressor, wherein the gas supplying lines for supplying hydrogen gas are used in turn toward the lower pressure side, depending on reduction in source pressure of the hydrogen gas stored in the high pressure tanks and the hydrogen gas supplied from either of the plurality of gas supplying lines is pressurized in the reciprocating compressor to supply a fuel cell vehicle.

According to the present invention, hydrogen gas generated by a reformer can be supplied to both a compressor and high pressure tanks and the gas in the high pressure tanks can be supplied to initial or middle compressing stages, so that hydrogen generated by the reformer can be effectively used. Additionally, operating cost of a fuel cell vehicle using hydrogen as a fuel can be reduced. Further, operating efficiency of a hydrogen refueling station for supplying hydrogen to the fuel cell vehicle is enhanced. Excessive hydrogen is not exhausted, but recycled as much as possible and the amount of hydrogen which remains in the hydrogen tank can be reduced.

Other objects, features and advantages of the invention will become apparent from the following description of the embodiments of the invention taken in conjunction with the accompanying drawings.

DETAILED DESCRIPTION OF THE INVENTION

Figure 1:
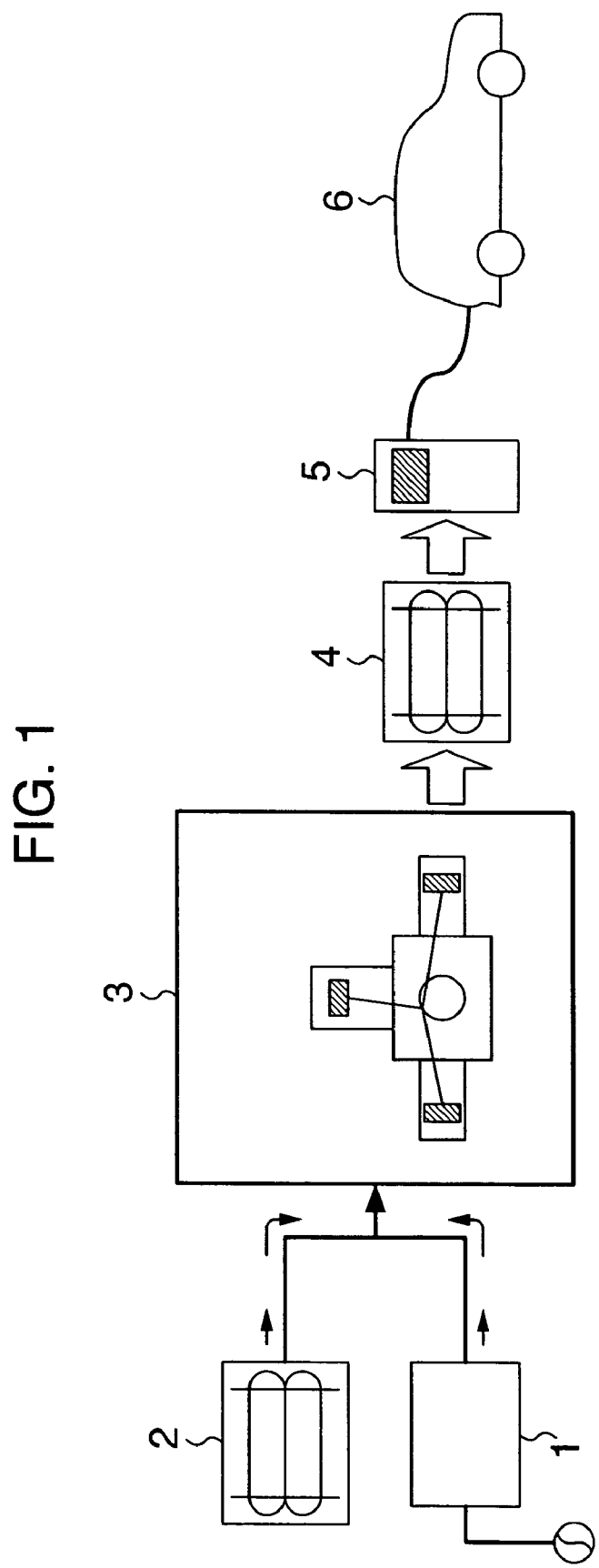
FIG. 1 is a schematic view of one embodiment of a hydrogen refueling station according to the present invention.

Now, one embodiment of a hydrogen refueling station according to the present invention will be described with reference to the drawings. FIG. 1 schematically shows a hydrogen refueling station 100 for supplying hydrogen, which is a fuel, to a fuel cell vehicle 6. Methods for supplying hydrogen gas to the fuel cell vehicle 6 include two types: on-site type and off-site type, as described above. In the on-site type, alcohol or petroleum fuel is reformed by a reformer 1 to obtain hydrogen fuel. Alternatively, pure hydrogen is generated by electrolysis of water, although it is not shown. In the hydrogen refueling station 100 comprising a hydrogen generating apparatus which generates pure hydrogen gas by means of the reformer 1 or the water electrolysis apparatus, pressure of generated hydrogen gas is about 0.6 MPa.

On the other hand, in the off-site hydrogen refueling station 100, pure hydrogen gas is extracted from by-product hydrogen or the like and sealed in a bomb 2 with high pressure. This high pressure bomb is referred to as a gas tank 2. In the gas tank 2, hydrogen gas is filled with a pressure of about 15 to 20 MPa. The hydrogen refueling station 100 described in this embodiment has features of both the on-site type and the off-site type.

It is necessary to increase pressure of hydrogen gas supplied from either of the reformer 1 or the gas tank 2, because the pressure is otherwise too low to supply to the fuel cell vehicle 6. For the purpose of increasing the pressure, a compressor unit 3 described in detail hereinafter is connected in the downstream side of the reformer 1 and the gas tank 2.

Hydrogen gas whose pressure has been increased sequentially to a predetermined pressure in the compressor unit 3 is temporarily stored in an accumulator unit 4. In order to supply the hydrogen gas with increased pressure to the fuel cell vehicle 6, a dispenser 5 which has an adapter conforming to a supply inlet of the fuel cell vehicle 6 is connected to the accumulator unit 4.

Figure 2:
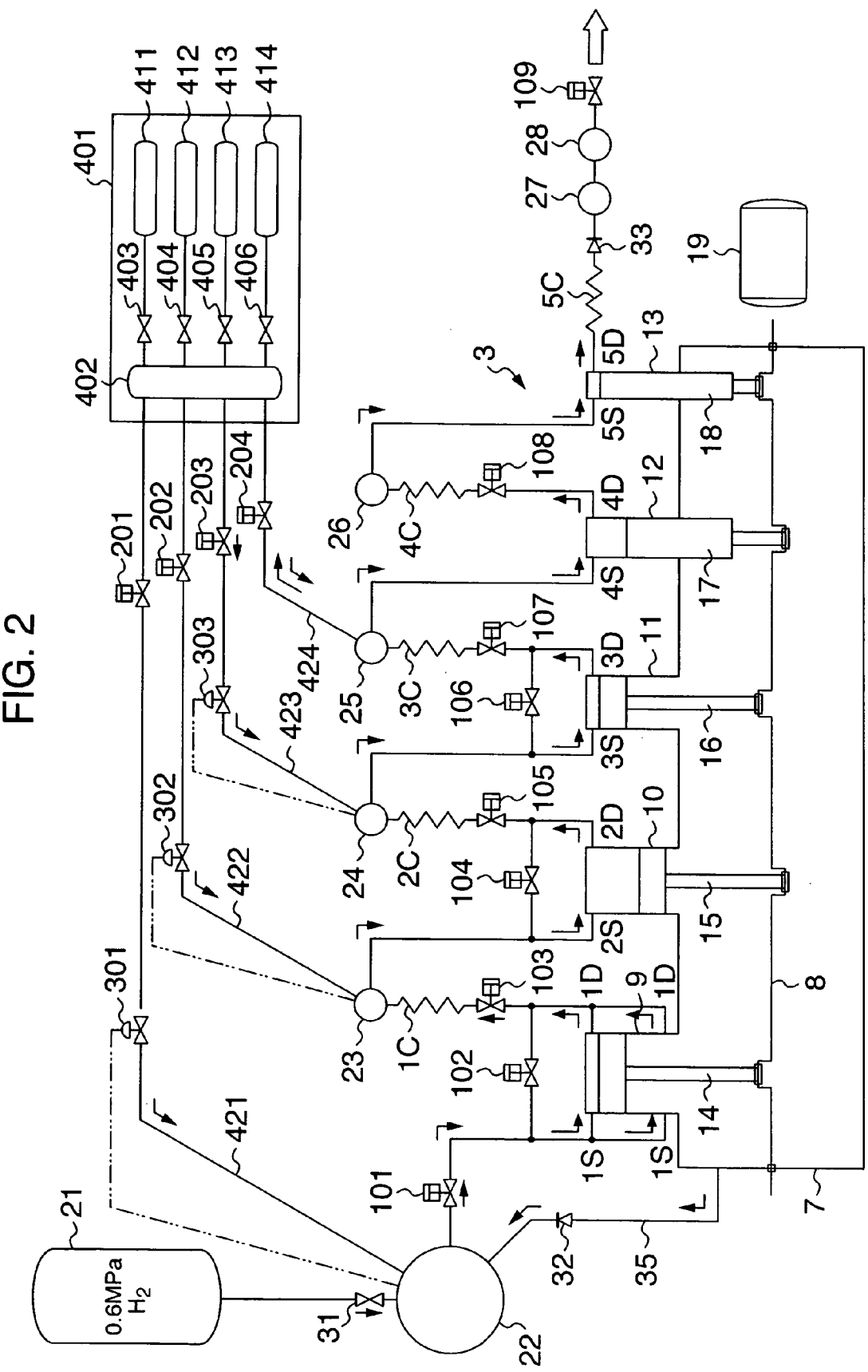
FIG. 2 is a detailed block diagram of the hydrogen refueling station shown in FIG. 1.

FIG. 2 shows a detailed block diagram of the compressor unit 3 used in the hydrogen refueling station 100 shown in FIG. 1. The compressor unit 3 has a crank shaft 8 connected to an output shaft of a motor 19 and five-stage compressing elements are attached to the crank shaft 8. That is, starting from the left side in FIG. 2, a first stage piston shaft 14, a second stage piston shaft 15, a third stage piston shaft 16, a fourth stage piston shaft 17, and a fifth stage piston shaft 18 are attached to crank parts of the crank shaft 8.

At ends of the piston shafts 14 to 18, pistons 14a to 18a which reciprocate in a first to a fifth stage cylinder 9 to 13 are attached respectively. The piston shafts 14 to 18 and the crank shaft 8 are contained in a frame 7. Although the crank shaft 8 is a horizontally extending shaft and the piston shafts 14 to 18 reciprocate in a vertical direction which is perpendicular to the shaft 8 in FIG. 2, the piston shafts 14 to 18 may reciprocate in two different directions which are perpendicular to the crank shaft 8 as shown in FIG. 1. In this arrangement, length of the crank shaft 8 can be reduced.

To a suction side 1S of a first compressing stage comprising the first stage cylinder 9 and the first stage piston 14a, a first stage snubber 22 is connected via a first stage suction control valve 101. Between a first stage discharge side 1D and a second stage suction side 2S, a second stage snubber 23 is connected via a first stage discharge control valve 103 and a first stage intercooler 1C. Similarly, a third stage snubber 24 is connected between a second stage discharge side 2D and a third stage suction side 3S via a second stage discharge control valve 105 and a second stage intercooler 2C, a fourth stage snubber 25 is connected between a third stage discharge side 3D and a fourth stage suction side 4S via a third stage discharge control valve 107 and a third stage intercooler 3C, and a fifth stage snubber 26 is connected between a fourth stage discharge side 4D and a fifth stage suction side 5S via a fourth stage discharge control valve 108 and a fourth stage intercooler 4C.

In addition, in the first to third compressing stages, suction tubes and discharge tubes are connected via bypass valves 102, 104, 106, respectively. To a discharge tube of the fifth compressing stage which is the final compressing stage, an aftercooler 5C, a check valve, a discharge snubber 27, a filter 28, and a fifth stage discharge control valve 109 are connected in series. Hydrogen gas leaked into the frame 7 is returned to the first stage snubber 22 through a return line 35 on which a check valve 32 is provided.

A supply source of supplying hydrogen to the hydrogen compressor configured in this manner is the reformer 21 in the case of the on-site type or a high pressure tank unit 401 in the case of the off-site type, as described above. In this embodiment, for the on-site type, the first stage snubber 22 and a reformer 21 are connected via a switching valve 31. On the other hand, for the off-site type, the high pressure tank unit 401 is connected to the first to third snubbers.

The high pressure tank unit 401 includes a plurality of high pressure tanks 411 to 414 which are connected to a header 402 via valves 403 to 406, respectively. The header and the first stage snubber are connected by a line 421 on which a remote control valve 201 and a control valve 301 are provided. Similarly, the header 402 and the second stage snubber 23 are connected by a line 422 on which a remote control valve 202 and a control valve 302 are provided, and the header 402 and the third stage snubber 24 are connected by a line 423 on which a remote control valve 203 and a control valve 303 are provided. The control valves 301 to 303 in the stages are driven by control signals transmitted by the snubbers 22 to 24 in the respective stages. Additionally, the fourth snubber 25 and the header 402 are connected by a line 424 via a remote control valve 204.

Operation of the hydrogen refueling station described in this embodiment configured in this manner will be described below. When it is used as an on-site hydrogen supplying station, hydrogen gas generated by the reformer 21 is passed into the first stage cylinder 9 through the first stage snubber 22 and the first stage suction control valve 101. The hydrogen gas passed into the first stage cylinder 9 is compressed by the first stage cylinder 9 and thereafter it is passed through the control valve 103 and cooled by the first stage intercooler 1C and then stored in the second stage snubber 23.

The hydrogen gas stored in the second stage snubber 23 is passed from the second stage snubber 23 to the suction side 2S of the second stage cylinder 10 and compressed by the second stage cylinder 10 and then discharged from the discharge side 2D. Then, the hydrogen gas is passed through the second stage control valve 105 and cooled by the second stage intercooler 2C and then stored in the third stage snubber 24. Through the same procedures, the hydrogen gas is compressed by the third stage cylinder 11, the fourth stage cylinder 12, and the fifth stage cylinder 13 so that pressure of the hydrogen gas is increased sequentially. The hydrogen gas compressed to a predetermined pressure by the fifth stage cylinder 13 is cooled by the aftercooler 5C and thereafter it is passed through the discharge snubber 27 and the filter 28 and then stored in an accumulator (not shown).

By the way, discharge pressure in the third stage cylinder 11 of the hydrogen compressor 3 in this embodiment is about 15 to 20 MPa. Thus, in order to allow the hydrogen refueling station to operate also as the off-site hydrogen refueling station, the high pressure tank unit 401 is connected to the fourth stage snubber 25 by the line 424. When the station is used as the off-site hydrogen refueling station, the bypass valves 102, 104, 106 are opened to unload the first to third stage cylinders 9 to 11 and the remote control valve 204 provided on the fourth stage line 424 is opened. Because filling pressure of the high pressure tanks 411 to 414 is about 15 to 20 MPa, which is just a required pressure for the fourth stage snubber 25, the station can be operated also as the off-site station.

In the off-site hydrogen refueling station, hydrogen gas filled in the high pressure tanks 411 to 414 is utilized. While the filled hydrogen gas may be of course supplied from the outside, the hydrogen gas created in the reformer 21 may be filled in the high pressure tanks 411 to 414 if an amount of hydrogen gas to be used is small, in order to enhance operating efficiency of the compressor 3 in this embodiment. This case will be described in detail below.

In the on-site hydrogen refueling station, it is difficult to start/stop the hydrogen generating facility such as the reformer 21 only in a short period of time. Thus, conventionally, the reformer 20 is continuously driven and the gas generated by the reformer 20 is burn or exhausted to the atmosphere if hydrogen filling load to the fuel cell vehicle 6 is low. In order to efficiently operate the hydrogen refueling station, it is necessary to avoid waste of hydrogen as much as possible. Thus, when the hydrogen filling load to the fuel cell vehicle 6 is low, hydrogen gas is filled with a pressure of about 15 to 20 MPa into the high pressure tanks 411 to 414 of the high pressure tank unit 401 from the fourth stage snubber 25.

On the other hand, when the hydrogen filling load to the fuel cell vehicle 6 is high, the hydrogen gas having a pressure of about 15 to 20 MPa which has been filled in the high pressure tanks 411 to 414 is used. In this case, the remote control valve 204 is opened to suck hydrogen gas from the fourth stage snubber 25 and the hydrogen gas is compressed to about 80 MPa by the fourth and fifth stage cylinders 12, 13.

Because the hydrogen gas supplied from the header 402 is added to the fourth stage cylinder 12, the compression ratio is relatively reduced in the entire compressor 3, so that an amount of power consumption in the compressor 3 is reduced and economic efficiency is improved. Once the hydrogen gas is supplied to the fuel cell vehicle 6, source pressure of the high pressure tanks 411 to 414 decreases gradually.

When the pressure of the high pressure tanks 411 to 414 is equal to or lower than an acceptable suction pressure of the fourth compressing stage, the remote control valve 204 provided on the line 424 communicating to the fourth stage snubber 25 is closed. Then, the remote control valve 203 provided on the line 423 communicating to the third stage snubber 24 is opened.

As a result, the hydrogen gas with reduced pressure which is stored in the high pressure tanks 411 to 414 is supplied to the third stage snubber 24, in place of the fourth stage snubber 25. Pressure of the hydrogen gas supplied to the third stage snubber is increased by the third to fifth stage cylinders 11 to 13 sequentially, so that the hydrogen gas is eventually compressed to a pressure of about 80 MPa. When the pressure in the high pressure tanks 411 to 414 further decreases, the lines 422, 421 connected to the header 402 are switched so that the hydrogen in the high pressure tanks 411 to 414 is supplied to the second stage snubber and the first stage snubber, in turn.

Finally, the remote control valve 201 provided on the line 421 communicating to the first stage snubber 22 is opened while the other remote control valves 202 to 204 are closed. In this condition, the compressor 3 can be operated without wasting hydrogen gas until the pressure in the high pressure tanks 411 to 414 decreases to about 0.6 MPa. Therefore, almost all hydrogen gas filled in the high pressure tanks 411 to 414 can be used.

Although the hydrogen refueling station having both the on-site type and the off-site type has been described in this embodiment, the present invention can be applied to a hydrogen refueling station having only the off-site type as well.

Further, because valves are controlled by detecting pressure of the hydrogen gas supplying lines in this embodiment, opening/closing of the valves can be automatically controlled. As a result, complex manual operation is not needed. As described above, waste such as burning the hydrogen gas generated by the reformer or exhausting the hydrogen gas to the atmosphere can be reduced, so that running cost of the compressor can be reduced. In addition, energy efficiency of the hydrogen refueling station is enhanced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A hydrogen compressor system provided in an on-site hydrogen refueling station comprising a hydrogen generating apparatus and a multi-stage reciprocating compressor having multiple compressing stages for pressurizing hydrogen generated by the hydrogen generating apparatus so that the hydrogen can be supplied to a fuel cell vehicle, wherein
hydrogen gas storing means is provided into which compressed hydrogen gas is supplied from a middle stage of the multi-stage reciprocating compressor,
the hydrogen storing means can supply the supplied hydrogen gas to an initial or the middle stage of the multi-stage reciprocating compressor, and the station can be also an off-site hydrogen refueling station,
the multi-stage reciprocating compressor comprises snubbers on suction sides of respective stages, and
the hydrogen gas storing means comprises a high pressure tank unit, and the high pressure tank unit and at least one of the plurality of snubbers are connected via a remote control valve.

2. A hydrogen compressor system according to claim 1, characterized in that at least one of the compressing stages having the snubber connected to the high pressure tank unit on the suction side has a bypass line for bypassing between the suction side and a discharge side and a valve provided on the bypass line.

3. A hydrogen compressor system provided in an on-site hydrogen refueling station comprising a hydrogen generating apparatus and a multi-stage reciprocating compressor having multiple compressing stages for pressurizing hydrogen generated by the hydrogen generating apparatus so that the hydrogen can be supplied to a fuel cell vehicle, wherein
hydrogen gas storing means is provided into which compressed hydrogen gas is supplied from a middle stage of the multi-stage reciprocating compressor,
the hydrogen storing means can supply the supplied hydrogen gas to an initial or the middle stage of the multi-stage reciprocating compressor, and the station can be also an off-site hydrogen refueling station,
the hydrogen generating apparatus comprises a reformer, and the multi-stage reciprocating compressor comprises a five-stage reciprocating compressor in which discharge pressure of a final stage is equal to or larger than 70 MPa, and
the hydrogen gas storing means includes a high pressure tank into which hydrogen gas discharged from a third compressing stage is supplied.

4. A hydrogen compressor system according to claim 3, characterized in that each of a first to a third compressing stage of the multi-stage reciprocating compressor has a piston, each of a fourth and a fifth compressing stage has a plunger, and discharge pressure of the third compressing stage is 15 to 20 MPa.

5. A hydrogen compressor system comprising a hydrogen generating apparatus for generating hydrogen gas to be supplied to a fuel cell vehicle and a multi-stage reciprocating compressor for pressurizing the hydrogen gas generated by the hydrogen gas generating apparatus, wherein
high pressure tanks having maximum use pressure of 20 MPa are connected to middle stages of the multi-stage reciprocating compressor by gas supplying lines via valves,
hydrogen gas in the high pressure tanks can be selectively supplied to the middle stages of the multi-stage reciprocating compressor by opening/closing the valves,
the multi-stage reciprocating compressor includes a middle stage to which the gas supplying line is connected, and compressing stages on an upstream side of the middle stage have a suction side and a discharge side connected to each other by a bypass line on which a switching valve is provided, and
the switching valves provided on the bypass lines are opened when hydrogen in the high pressure tank is supplied to the multi-stage reciprocating compressor.

6. A hydrogen compressor system according to claim 5, characterized in that the multi-stage reciprocating compressor has snubbers on suction sides of respective compressing stages and each compressing stage has a control valve on a suction line between the snubber and the suction side.

7. A hydrogen compressor system comprising a first line in which hydrogen gas generated by a hydrogen generating apparatus is pressurized in a multi-stage reciprocating compressor to supply to a fuel cell vehicle and a second line in which hydrogen gas is supplied from high pressure tanks, in which hydrogen gas is filled with a lower pressure than discharge pressure of the reciprocating compressor, to an initial or a middle stage of the reciprocating compressor and the hydrogen gas is pressurized in the reciprocating compressor to supply to the fuel cell vehicle, wherein when filling load of the hydrogen gas to the fuel cell vehicle is low, the hydrogen gas is stored in the high pressure tank using the second line, and when the filling load is high, the hydrogen gas stored in the high pressure tank using the second line is supplied to the reciprocating compressor to reduce compression ratio of the reciprocating compressor.

8. A hydrogen compressor system comprising a multi-stage reciprocating compressor for pressurizing hydrogen gas, high pressure tanks in which hydrogen gas is filled with a lower pressure than discharge pressure of the multi-stage reciprocating compressor, and a plurality of gas supplying lines for supplying hydrogen gas from the high pressure tanks to an initial or a middle stage of the reciprocating compressor, wherein the gas supplying lines for supplying hydrogen gas are used in turn toward the lower pressure side, depending on reduction in source pressure of the hydrogen gas stored in the high pressure tanks, and the hydrogen gas supplied from either of the plurality of gas supplying lines is pressurized in the reciprocating compressor to supply a fuel cell vehicle.

* * * * *